United States Patent
Ando et al.

(10) Patent No.: US 9,583,773 B2
(45) Date of Patent: Feb. 28, 2017

(54) SOLID OXIDE FUEL CELL UNIT

(71) Applicant: TOTO LTD., Kitakyushu-shi, Fukuoka (JP)

(72) Inventors: Shigeru Ando, Odawara (JP); Naoki Watanabe, Chigasaki (JP); Takuya Hoshiko, Kanagawa (JP); Shuhei Tanaka, Chigasaki (JP); Masaki Sato, Fujisawa (JP); Nobuo Isaka, Yokohama (JP); Yutaka Momiyama, Yokohama (JP); Seiki Furuya, Fujisawa (JP); Kiyoshi Hayama, Fujisawa (JP); Yasuo Kakinuma, Chigasaki (JP); Osamu Okamoto, Chigasaki (JP)

(73) Assignee: TOTO LTD., Fukuoka (JP)

( * ) Notice: Subject to any disclaimer, the term of this patent is extended or adjusted under 35 U.S.C. 154(b) by 126 days.

(21) Appl. No.: 14/322,390

(22) Filed: Jul. 2, 2014

(65) Prior Publication Data
US 2015/0010842 A1 Jan. 8, 2015

(30) Foreign Application Priority Data

Jul. 3, 2013 (JP) .................................. 2013-139340

(51) Int. Cl.
*H01M 8/04* (2016.01)
*H01M 8/12* (2016.01)
(Continued)

(52) U.S. Cl.
CPC ..... *H01M 8/04201* (2013.01); *H01M 8/0252* (2013.01); *H01M 8/1226* (2013.01);
(Continued)

(58) Field of Classification Search
None
See application file for complete search history.

(56) References Cited

U.S. PATENT DOCUMENTS

2006/0147778 A1* 7/2006 Matsuzaki .............. H01M 6/00
429/454
2008/0118812 A1 5/2008 Kawakami et al.
(Continued)

FOREIGN PATENT DOCUMENTS

EP 1 603 183 A1 12/2005
EP 2 264 821 A1 12/2010
(Continued)

OTHER PUBLICATIONS

Extended European Search Report for European Patent Application Serial No. 14 175 383.0 dated Nov. 17, 2014, 6 pages.
(Continued)

*Primary Examiner* — Daniel Gatewood
(74) *Attorney, Agent, or Firm* — Brinks Gilson & Lione

(57) ABSTRACT

Provided is a solid oxide fuel cell unit comprising an insulating support, and a power generation element comprising, at least, a fuel electrode, an electrolyte and an air electrode, which are sequentially laminated one another, the power generation element being provided on the insulating support, wherein an exposed insulating support portion, an exposed fuel electrode portion, and an exposed electrolyte portion are provided in an fuel electrode cell end portion.

6 Claims, 7 Drawing Sheets

(51) Int. Cl.
*H01M 8/24* (2016.01)
*H01M 8/02* (2016.01)
(52) U.S. Cl.
CPC ......... *H01M 8/1286* (2013.01); *H01M 8/243* (2013.01); *H01M 2008/1293* (2013.01); *H01M 2300/0074* (2013.01); *Y02E 60/521* (2013.01); *Y02E 60/525* (2013.01)

(56) References Cited

U.S. PATENT DOCUMENTS

| | | | |
|---|---|---|---|
| 2010/0304249 A1* | 12/2010 | Tsuchiya | C01B 3/38 429/429 |
| 2014/0080034 A1 | 3/2014 | Ando et al. | |
| 2015/0004517 A1 | 1/2015 | Watanabe et al. | |

FOREIGN PATENT DOCUMENTS

| | | |
|---|---|---|
| EP | 2 709 199 A1 | 3/2014 |
| EP | 2 819 229 A1 | 12/2014 |

OTHER PUBLICATIONS

Office Action in corresponding European Application No. 14 175 383.0, dated Mar. 23, 2016, 5 pages.

* cited by examiner

FIG.7
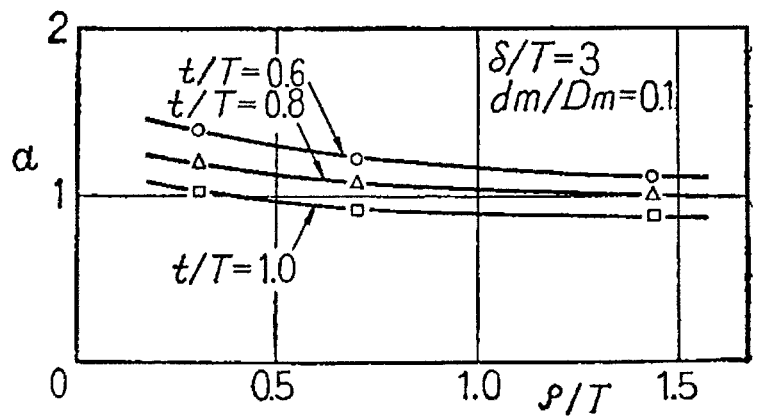
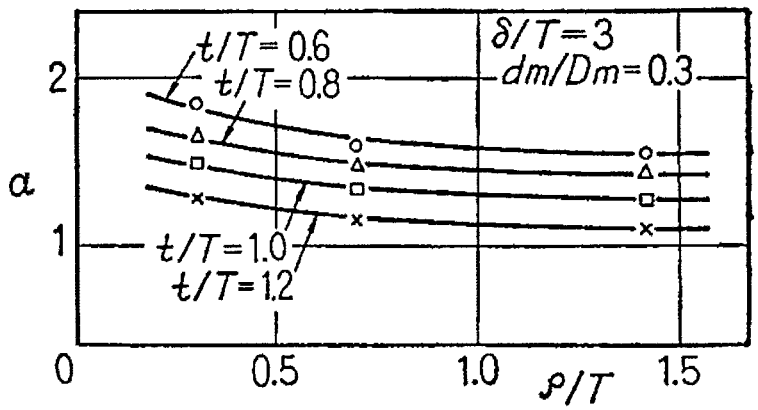
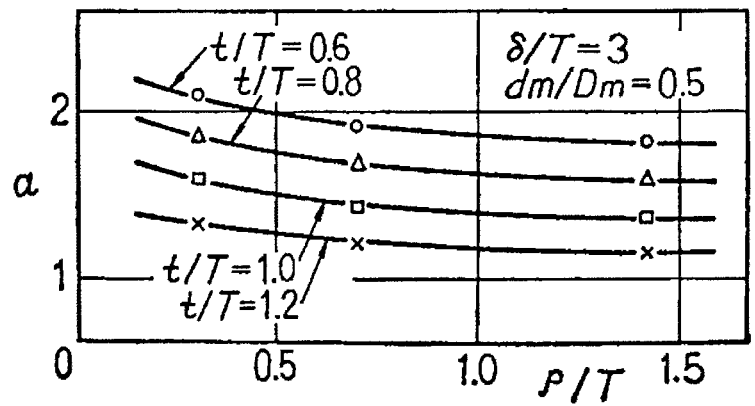

SOLID OXIDE FUEL CELL UNIT

RELATED APPLICATIONS

This application claims priority under 35 U.S.C. §119 to Japanese Patent Application No. 2013-139340 filed on Jul. 3, 2013, the entire content of which is hereby incorporated by reference.

BACKGROUND OF THE INVENTION

1. Technical Field

The present invention relates to a solid oxide fuel cell unit. In particular, the present invention relates to a solid oxide fuel cell unit that is gas-tightly fixed to a fuel gas tank, the solid oxide fuel cell unit having a joint portion which provides the gas-tight fixation and which is highly reliable against repetition of operations of the solid oxide fuel cell unit where the solid oxide fuel cell unit is activated by raising a temperature from room temperature to high temperature and is stopped by lowering a temperature from high temperature to room temperature.

2. Background Art

A solid oxide fuel cell (hereinafter also referred to as "SOFC") includes a solid-oxide ion-conducting electrolyte as the electrolyte, and electrodes are attached to both sides of the electrolyte. The fuel cell is operated at relatively high temperature by supplying a fuel gas to one electrode and an oxidizing agent gas (air, oxygen, or the like) to the other electrode.

A solid oxide fuel cell apparatus, especially, a fuel cell module housing solid oxide fuel cell units comprises a fuel flow path for supplying a fuel to the solid oxide fuel cell units, an oxidizing agent gas flow path for supplying an oxidizing agent gas such as air thereto. In general, these flow paths are constituted of multiple constituent members. The flow paths are formed by joining the constituent members together. In addition, since solid oxide fuel cells are generally operated at high temperature of 600 to 1000° C., the joints of the solid oxide fuel cell units to constituent members (for example, a fuel gas tank) have to withstand such high temperature.

Japanese Patent No. 5173458 proposes a cell in which an electrically conductive lead film (Ni—MgAl$_2$O$_4$) is formed on a surface of a substrate tube (15% calcia-stabilized zirconia) and a gas-tight film (8% yttria-stabilized zirconia) is formed on a surface of the lead film, wherein an adhesion-improving film having an appropriate thermal expansion is provided between a surface of the gas-tight film and an adhesive agent.

Japanese Patent No. 5080951 refers to a distance between a current collector and an active fuel electrode layer provided on a fuel electrode in a solid oxide fuel cell unit comprising a plurality of power generation elements in order to suppress peeling of an internal electrode and the like and formation of cracks and the like.

Japanese Patent Application Publications Nos. 2010-257744 and 2008-59793 disclose views showing how cells arranged upright are gas-tightly joined to a fuel gas tank.

Japanese Patent No. 3064087 proposes a method for producing a solid electrolyte cell, in which simultaneous calcination of a substrate tube, and a part or the entirety of an electrode and an electrolyte makes it possible to achieve stability in performance and reduce the man-hour of the production.

Moreover, Japanese Patent No. 5188236 proposes a gas supply/exhaust manifold which can simplify the gas supply/exhaust structure. Cells are inserted through insertion holes formed in plates of an insulating material, and are sealed by gas seal members.

SUMMARY OF THE INVENTION

When a solid oxide fuel cell unit is joined to and integrated with a fuel gas tank, it is desirable that operations of the solid oxide fuel cell unit where the solid oxide fuel cell unit is activated by raising a temperature from room temperature and is stopped at room temperature does not cause deterioration in the gas tightness at the joint portion between the fuel gas tank and the solid oxide fuel cell unit. In particular, at the time of the activation operation, unevenness in temperature is created in the fuel cell module by the fuel gas. The joint portion needs to have reliable gas tightness even under strain, stress, and the like due to such unevenness in temperature. Besides, the difference in thermal expansion between different materials generates a large stress in the joint portion, so that cracks tend to be formed in the cells. Even if the cracks are minute, the cracks grow during repetition of activation operation, running operation, and stop operation. In addition, if the air enters the fuel electrode through a cracked portion, the fuel electrode is oxidized, and thereby swells. As a result, the cracks of the cells further develop. Further repetition of the abovementioned operations would collapse the cell in the end. In addition, during the operations, the fuel electrode is oxidized because of fuel shortage caused during load-following operation. This also contributes cracks in the cell. As described above, the conventional configuration of a cell in which a power generation element comprising a fuel electrode, an electrolyte, and an air electrode is provided on an insulating support likely to cause cracks in the joint portion during the above mentioned operations.

Japanese Patent No. 5173458 proposes a structure of a solid oxide fuel cell in which the lead film and a current-collecting member are configured to extend to an end portion of the substrate tube. In this structure, a stress due to strain caused by unevenness in temperature of a solid oxide fuel cell during activation operation concentrates on the end portion of the substrate tube, which may cause cracks in the substrate tube, the lead film, or the gas-tight film. In addition, according to page 144 of "KOTAI SANNKABUTSU NENNRYOU DENNCHI TO CHIKYUU KANNKYOU (Solid Oxide Fuel Cells and the Global Environment, authored by Tagawa Hiroaki, published by Agune-sha, on Jun. 20, 1998)," the coefficient of thermal expansion of 8% yttria-stabilized zirconia is 10.3, and the coefficient of thermal expansion of 15% calcia-stabilized zirconia is 10.3. Both zirconias have the same coefficient value. Even if these materials with the same coefficient of thermal expansion are selected, a tensile stress acts on the film depending on the degree of the unevenness in temperature during activation operation, so that cracks may run in the gas-tight film.

Japanese Patent No. 5080951 proposes that the current collector and an inner electrode are formed with a predetermined distance provided therebetween to reduce residual stress generated at a boundary portion during stacking or calcination, and suppress peeling of the inner electrode and formation of cracks and the like. Moreover, Japanese Patent No. 5080951 discloses a structure in which two solid oxide fuel cell units are electrically connected to each other via a connection member. A joint portion is provided between the solid oxide fuel cell unit and the connection member, the joint portion being displaced at a portion where the fuel electrode, the electrolyte, and the air electrode are sequentially laminated on the insulating support. If such a joint portion is displaced between the solid oxide fuel cell unit and a fuel gas tank as the connecting member cracks may be caused in the joint portion during activation operation or stop operation.

In disclosure by Japanese Patent Application Publications Nos. 2010-257744 and 2008-59793, a cell in which an electrolyte is covered up to an end portion of an insulating support is used, and a part or the entirety of a joint portion is joined to the cell comprising the insulating support and the electrolyte in this order. In this joint structure, cracks are formed in the electrolyte at an end portion of the cell during activation operation or stop operation, and, in turn, resulting in gas leakage through cracks so that the cell is critically damaged.

Japanese Patent No. 3064087 does not describe the use of solid oxide fuel cell units that are gas-tightly fixed to a fuel gas tank. Japanese Patent No. 3064087 does not recognize such a problem that when the solid oxide fuel cell units that are gas-tightly fixed to the fuel gas tank are activated and stopped, cracks tend to be formed in the electrolyte near the joint. With no awareness of the problem, the figure shows a segmented-in-series solid oxide fuel cell unit where an exposed length of the electrolyte is short. In this fuel cell unit, cracks tend to be formed in the electrolyte near the joint during activation operation or stop operation.

Moreover, the cells described in Japanese Patent No. 5188236 are based on fuel electrode tubes. A fuel electrode support mainly made of Ni metal has a higher fracture toughness than and hence is less likely to be broken than an insulating support made of an oxide, because it is made of a metal. Accordingly, Japanese Patent No. 5188236 does not involve the problem which a solid oxide fuel cell unit including an insulating support made of an oxide has during its activation operation and stop operation.

An object of the present invention is to provide a solid oxide fuel cell unit that is gas-tightly fixed to a fuel gas tank, the solid oxide fuel cell unit having a joint portion which provides the gas-tight fixation and which is highly reliable against repetition of activation operation of the solid oxide fuel cell unit from room temperature to high temperature and stop operation thereof from high temperature to room temperature.

To solve the above-described problem, the present invention provides a solid oxide fuel cell unit comprising:

an insulating support having a gas flow path therein; and at least one power generation element which is provided on a surface of the insulating support and which comprises a fuel electrode, an electrolyte, and an air electrode, the fuel electrode, the electrolyte, and the air electrode being sequentially laminated one another, the insulating support being made of a porous material comprising an oxide, and the electrolyte being made of an oxide having a smaller coefficient of thermal expansion than a coefficient of thermal expansion of the insulating support, wherein the solid oxide fuel cell unit further comprises an exposed electrolyte portion, an exposed fuel electrode portion, and an exposed insulating support portion, and the exposed insulating support portion, the exposed fuel electrode portion, and the exposed electrolyte portion are arranged in this order at at least one end portion of the solid oxide fuel cell unit, the exposed insulating support portion being arranged at one most outer end of the solid oxide fuel cell unit.

Even when repeatedly activated and stopped, the solid oxide fuel cell unit of the present invention is less susceptible to formation of cracks in the electrolyte. This is presumably for the following reason. It is not preferable to allow gas leakage in the electrolyte, because the electric power generation performance remarkably deteriorates. For this reason, the electrolyte is designed so that a compressive stress always acts on the electrolyte to prevent growth of cracks. Specifically, the materials of the electrolyte and the insulating support are selected so that the electrolyte has a coefficient of thermal expansion smaller than that of the insulating support. Multiple solid oxide fuel cell units are disposed on a fuel gas tank for uniformly distributing fuel to the solid oxide fuel cell units. The solid oxide fuel cell units are gas-tightly joined to the fuel gas tank by glass or the like to prevent gas leakage. Specifically, the exposed electrolyte portion in the solid oxide fuel cell units is gas-tightly joined to the fuel gas tank. Because of the unevenness in temperature during activation operation or stop operation, a load not lighter than that caused by difference in thermal expansion between the electrolyte and the insulating support is applied to the exposed electrolyte portion joined to the fuel gas tank by glass. If the electrolyte is directly laminated on the insulating support, the stress generated in the electrolyte acts on the electrolyte without relaxation because the insulating support made of an oxide does not deform plastically. For this reason, cracks are formed in the electrolyte during activation operation or stop operation, in some cases. The present inventors have found that since the fuel electrode deforms plastically, the residual stress generated in the electrolyte is reduced when a fuel electrode having metallic character is provided between the insulating support and the electrolyte. However, when an end of the insulating support and an end of the electrolyte are flush with each other, stress due to the plastic deformation of the fuel electrode concentrates on the interface between the insulating support and the fuel electrode, and this tensile stress increases the possibility of crack formation in the insulating support. By providing the exposed portions comprising the exposed insulating support portion, the exposed fuel electrode portion, and the exposed electrolyte portion in this order at at least one end portion of the solid oxide fuel cell unit, the stress generated in the fuel electrode between the electrolyte and the insulating support is relaxed by the plastic deformation of the exposed fuel electrode portion, and further the stress generated in the insulating support is relaxed. Presumably because of this, the concentration of the stress can be avoided, and the formation of cracks in the electrolyte can be reduced during activation operation and stop operation.

In an aspect of the present invention, the solid oxide fuel cell unit, wherein:

the at least one power generation element includes a plurality of power generation elements, the solid oxide fuel cell unit comprising:

an interconnector electrically connecting the fuel electrode of one of adjacent two of the power generation elements to the air electrode of the other power generation element, an exposed insulating electrolyte portion provided, for electrical insulation, between the interconnector and the air electrode constituting the one power generation element, wherein a relationship of L3>L4 is satisfied, where L4 is the length of the exposed insulating electrolyte portion, and L3 is the length of the exposed electrolyte portion. In the solid oxide fuel cell unit the number of the power generation elements is, for example, 2 or more and 100 or less, preferably 2 or more and 30 or less, and more preferably 5 or more and 25 or less.

The exposed electrolyte portion is a region which is present between the air electrode and the exposed fuel electrode portion, and which is joined to the fuel gas tank made of metal. Accordingly, the exposed electrolyte portion has both a function of establishing electrical insulation of the air electrode, the exposed fuel electrode portion, and the fuel gas tank, and a function of joining them with a high gas tightness. It is not necessary to set the length of the exposed insulating electrolyte portion (L4) longer than the length of the exposed electrolyte portion (L3). The relationship of L3>L4 leads to the reduced total length of the solid oxide fuel cell unit, and the reduced unevenness in temperature in the fuel cell module.

In an aspect of the present invention, a relationship of L3>L2 is satisfied, where L2 is the length of the exposed fuel electrode portion.

According to the present invention thus configured, the possibility of crack formation in the electrolyte during load-following operation is reduced. This is presumably for the following reason. Specifically, the exposed fuel electrode portion also serve as a connection portion for current extraction, and the length of the exposed fuel electrode portion (L2) is determined according to the amount of current generated by the solid oxide fuel cell unit. In addition, during operation, the electric power generation unit generates heat because of the internal resistance, and the amount of heat generated increases or decreases depending on the power load-following operation. For this reason, the temperature of the electrolyte of the power generation element varies depending on the amount of the current. As the amount of current generated by the solid oxide fuel cell unit increases, the thermal cycle stress increases. If the length of the exposed electrolyte portion is short, so that the power generation element is too close to the exposed fuel electrode portion, the thermal cycle stress of the power generation element generates stress at the interface between the end portion of the electrolyte and the fuel electrode, so that the possibility of crack formation is increased. Since the magnitude of the thermal cycle stress depends on the amount of the current generated, it is desirable that L3 is longer than L2 determined according to the amount of the current of the power generation.

In addition, during operation, a power load-following operation is conducted to increase the fuel utilization. The change in gas flow rate is slower than the change in amount of the current, and hence the gas flow rate may be short with respect to the amount of the current. An operation under the shortage of the gas flow rate leads to shortage in amount of hydrogen at the fuel electrode under the electrolyte. As a result, the fuel electrode is oxidized and swells, and a tensile stress acts on the electrolyte. Also from this viewpoint, the setting of L3 longer than L2 determined according to the amount of the current of the electric power generation is effective in relaxing stress due to the shortage of hydrogen.

In an aspect of the present invention, the total of the length of the exposed insulating support portion (L1) and L2 satisfies a relationship of $T<(L1+L2)\times 2$, where T is the wall thickness of the fuel gas tank at a portion where the fuel gas tank and the solid oxide fuel cell are gas-tightly joined to each other.

This configuration relaxes the stress concentration in the solid oxide fuel cell unit during activation operation and stop operation, and thereby improves the reliability of the gas tightness. This is presumably for the following reason. The present inventors went back to the basic of the stress concentration, and have conducted detailed investigation. "OURYOKU SHUUCHUU (Stress Concentration)" (authored by Nishida Masataka and published by Morikita Publishing Co., Ltd., on Nov. 7, 1988, enlarged edition, sixth impression) describes, on Pages 767 to 780, the stress concentration factor on a cylindrical tube having a branch and receiving inner pressure, and reports, on pages 777 to 778, results of a photoelastic experiment regarding a stress concentration relaxation effect in a case where a main tube and a branch tube are joined to each other at a right angle in a through manner. FIG. 151-20 (for reference, reprinted as FIG. 5) of this document shows a case where the main tube and the branch tube are joined perpendicularly to each other in a through manner. In this figure, Dm is the average diameter of the main tube, dm is the average diameter of the branch tube, T is the average thickness of the main tube, t is the average thickness of the branch tube, $\delta$ is the height by which the branch tube projects from the inner wall of the main tube, and $\rho$ is the radius of a curve at a corner formed by the main and branch tubes. When the stress generated in the cylindrical tube having Dm and T at an inner pressure P is denoted by $\sigma 1$, and the stress generated at a point which is near the center of the thickness of the wall of the main tube and which is located on a line of intersection between the inner wall surface of the branch tube and a plane connecting the central axes of the main and branch tubes is denoted by $\sigma 2$, $\sigma 2$ represents the maximum stress. Here, $\sigma 2/\sigma 1$ is defined as the stress concentration factor $\alpha$, and the relationship between $\delta/T$ and $\alpha$ obtained through the experiment is shown in FIG. 151-21 and FIG. 151-22 (similarly, reprinted as FIG. 6 and FIG. 7 for reference). Incidentally, what is discussed here is a case of a system constituted of two tubes. The results on Pages 777 to 778 cannot be directly applied to a fuel cell, because solid oxide fuel cell units are joined to a fuel gas tank, and at least because a case where the fuel gas tank is a cylindrical tube is rare. However, the present inventors have conducted detailed investigation, and consequently have been aware of the fact that even when the relationship of Dm relative to dm changes, i.e., the dm/Dm varies, the relationship between $\delta/T$ and the stress concentration factor $\alpha$ does not change greatly. In other words, the present inventors have found that when the $\delta/T$ value exceeds 2 in a case where the main tube and the branch tube are joined to each other at a right angle in a through manner, and the branch tube is smaller than the main tube, the stress concentration factor $\alpha$ reaches the lower design limit. Here, when $\delta$ is interpreted as a value obtained by summing up L1 and L2, it can be understood that the stress concentration factor is small when a value obtained by multiplying the sum of L1 and L2 by 2 is larger than the thickness T of the joint portion of the fuel gas tank, and it is conceivable that the reliability of the joint of the cell is high.

L1 is preferably greater than the thickness T of the joint portion of the fuel gas tank from the viewpoint of the relaxation of the stress concentration. In addition, L1 is preferably equal to or smaller than L3. With this configuration, the distance to the electric power generation unit decreases, so that the time taken to supply the fuel gas to the power generation element is reduced. Particularly in a low-load operation, the gas flow rate is low, and the time taken until the fuel gas reaches the power generation element is long. This configuration is preferable, because the delay in load-following during operation becomes short, so that the damage on the power generation element due to the shortage of fuel is reduced.

In addition, the exposed insulating support portion and the exposed fuel electrode portion are porous and thereby lack strength. On the other hand, the exposed electrolyte portion is dense enough to be impermeable to gas, and hence has stable strength in a state where a compressive stress is generated. Accordingly, stable mechanical strength can be obtained by the joining to the fuel gas tank at the exposed electrolyte portion. The exposed fuel electrode portion provides electrical connection. When an end portion is formed by the exposed fuel electrode portion which is porous and lacks the strength, cracks tend to grow. Hence, by providing the exposed insulating support portion, cracks become less likely to grow. By making the exposed insulating support portion longer than the exposed fuel electrode portion, the stress due to the current collection is well balanced. As a result, the end portion of the cell becomes resistant to crack formation.

The solid oxide fuel cell stack of the present invention comprises the solid oxide fuel cell unit, a fuel gas tank, and a current collector. Here, the fuel gas tank is gas-tightly joined to the exposed electrolyte portion, and the current collector is joined to the exposed fuel electrode portion or the air electrode to extract a current. Thus, cracks in the solid oxide fuel cell unit are prevented, and high reliability can be achieved for a long period.

The use of the solid oxide fuel cell unit of the present invention makes it possible to provide a fuel cell battery in which the solid oxide fuel cell unit is gas-tightly joined to constituents in a fuel cell module in a favorable manner, even after repetition of activation operation, running operation, and stop operation.

BRIEF DESCRIPTION OF THE DRAWINGS

FIG. 7 is a material to which reference is made in the present invention, and shows graphs showing the relationship between ρ/T and stress concentration factor α.

DETAILED DESCRIPTION OF THE PREFERRED EMBODIMENTS

Figure 1:
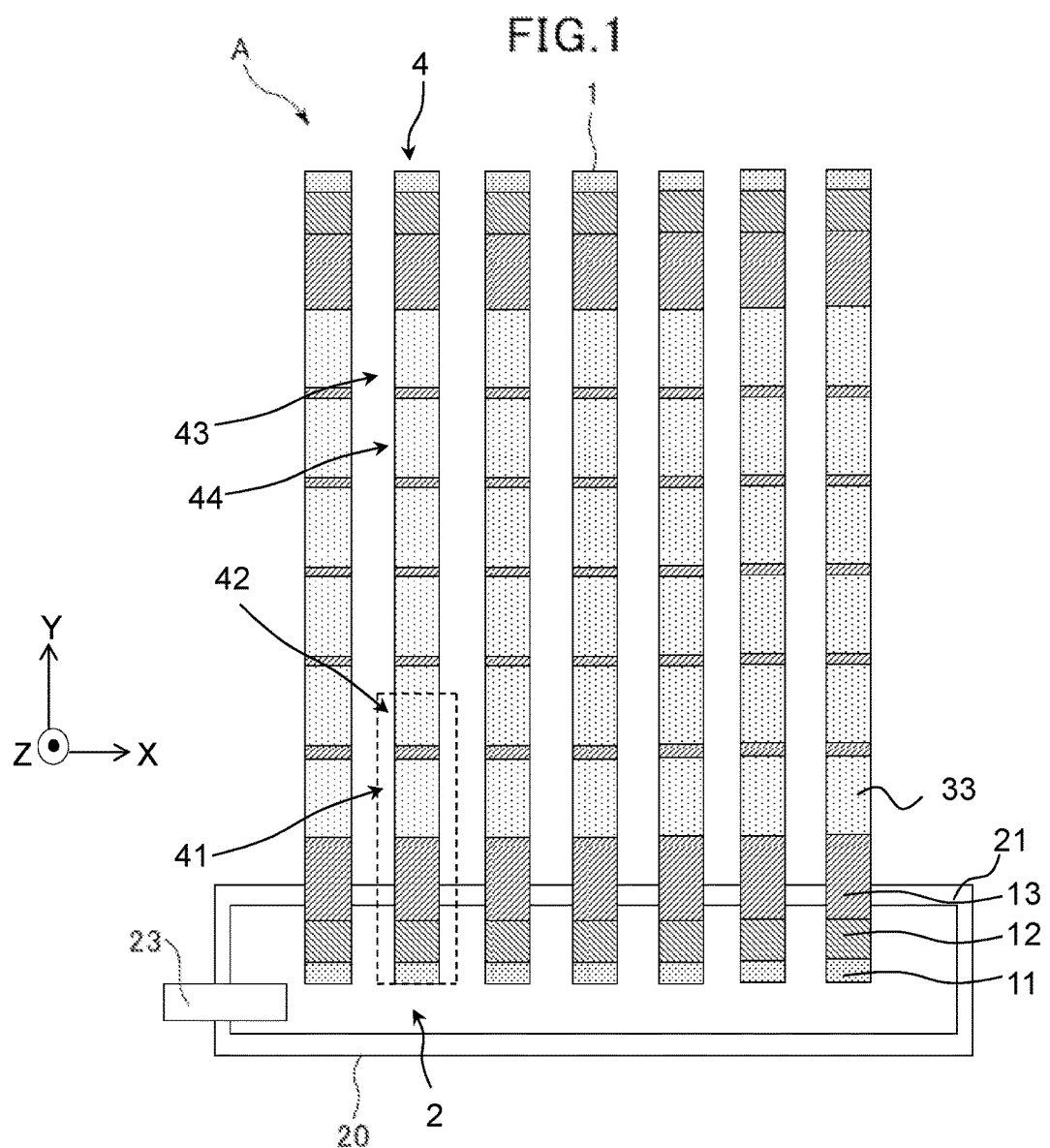
FIG. 1 shows a fuel cell stack using one embodiment of the present invention.

As shown in FIG. 1, in a fuel cell stack A using one embodiment of the present invention, a plurality of (seven in FIG. 1) solid oxide fuel cell units 1 are integrated with a fuel gas tank 20. A fuel gas is introduced through a gas flow path 23 into the fuel gas tank, and the gas is supplied substantially uniformly to the solid oxide fuel cell units. The solid oxide fuel cell units are electrically connected, although the electrical connection is not illustrated. The electrical connection may be provided at an exposed fuel electrode portion 12 in the fuel gas tank, or at an air electrode 14. The fuel gas tank 20 may be a metal container, or may be partially made of a ceramic or glass. Moreover, a gas-diffusing jig for improving the gas diffusibility may be provided inside the fuel gas tank 20. The fuel gas tank 20 may be configured to distribute the gas fuel to each of the solid oxide fuel cell units 1.

Figure 2:
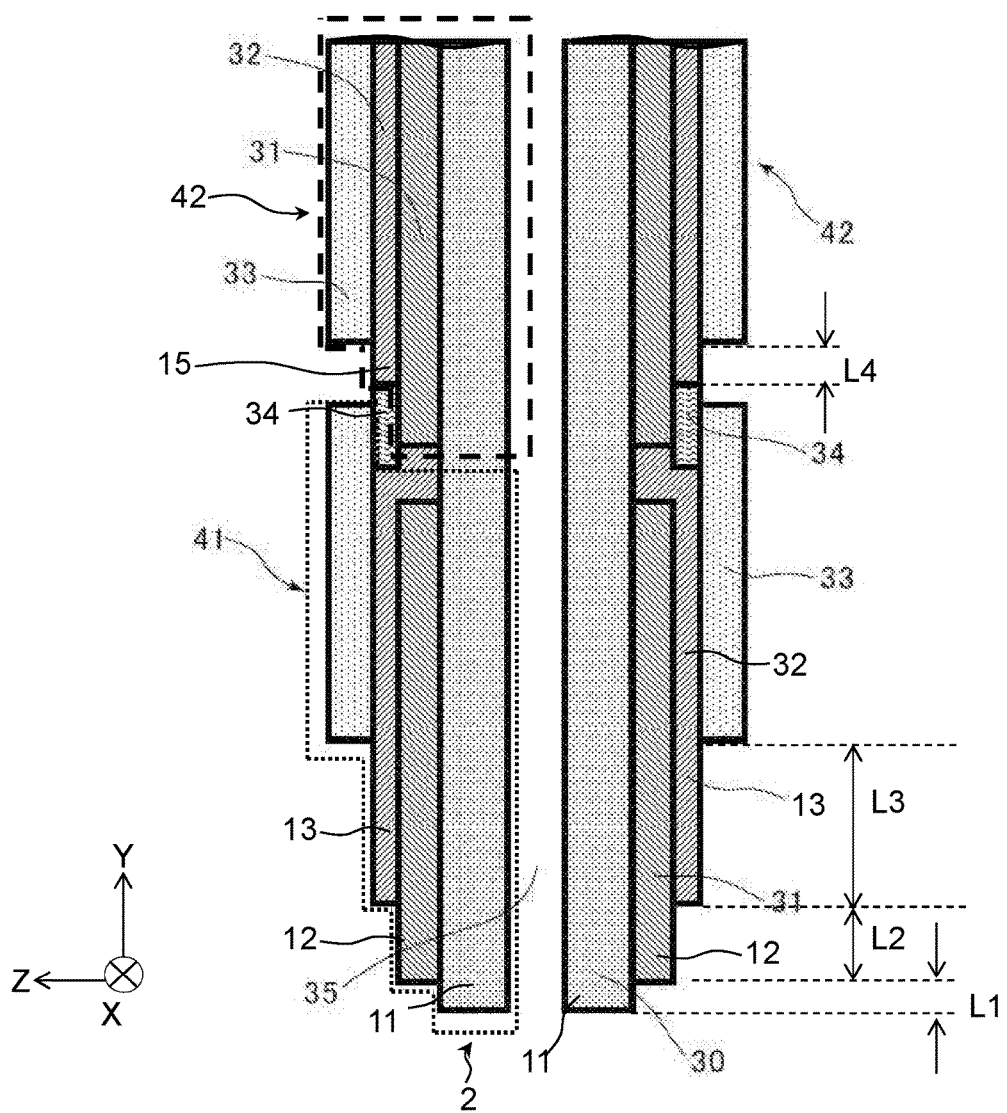
FIG. 2 is a cross-sectional view of an end portion of a solid oxide fuel cell unit according to one embodiment of the present invention.

FIG. 2 shows a cross section of an end portion 2 of each of the solid oxide fuel cell units 1 near a region where the solid oxide fuel cell unit 1 and the fuel gas tank 20 are gas-tightly joined to each other. In one embodiment of the present invention, an insulating support 30 in which a gas flow path 35 is provided is made of a porous material oxide mainly containing forsterite ($Mg_2SiO_4$).

In the insulating support 30, a plurality of power generation elements are disposed. In FIG. 2, two power generation elements 41 and 42 are illustrated, but the power generation elements are not limited thereto. In one embodiment of the present invention, the power generation element 41 provided at an end of the cell unit comprises, from the inside, a fuel electrode 31 made of yttria-stabilized zirconia (YSZ) with nickel or nickel oxide, an electrolyte 32 made of strontium- and magnesium-doped lanthanum gallate (LSGM), and an air electrode 33 made of lanthanum strontium cobalt ferrite (LSCF). The fuel electrode 31 may also serve as a fuel side electrically conductive layer. In addition, although not illustrated, a fuel electrode catalyst layer made of gadolinium-doped ceria (GDC) with nickel or nickel oxide and a reaction inhibition layer made of lanthanum-doped ceria (LDC) may be layered between the fuel electrode 31 and the electrolyte 32. In one embodiment of the present invention, the power generation element 42 provided adjacent to the power generation element 41 also comprises, from the inside, a fuel electrode 31 made of YSZ with nickel or nickel oxide, an electrolyte 32 made of LSGM, and an air electrode 33 made of LSCF. The fuel electrode 31 may also serve as a fuel side electrically conductive layer. In addition, although not illustrated, a fuel electrode catalyst layer made of GDC with nickel or nickel oxide and a reaction inhibition layer made of LDC may be layered between the fuel electrode 31 and the electrolyte 32. The power generation element 41 and the power generation element 42 are electrically connected to each other by an interconnector 34 made of lanthanum-doped strontium titanate (SLT). A reaction inhibition layer and the like may be provided between any of these layers.

Figure 3:
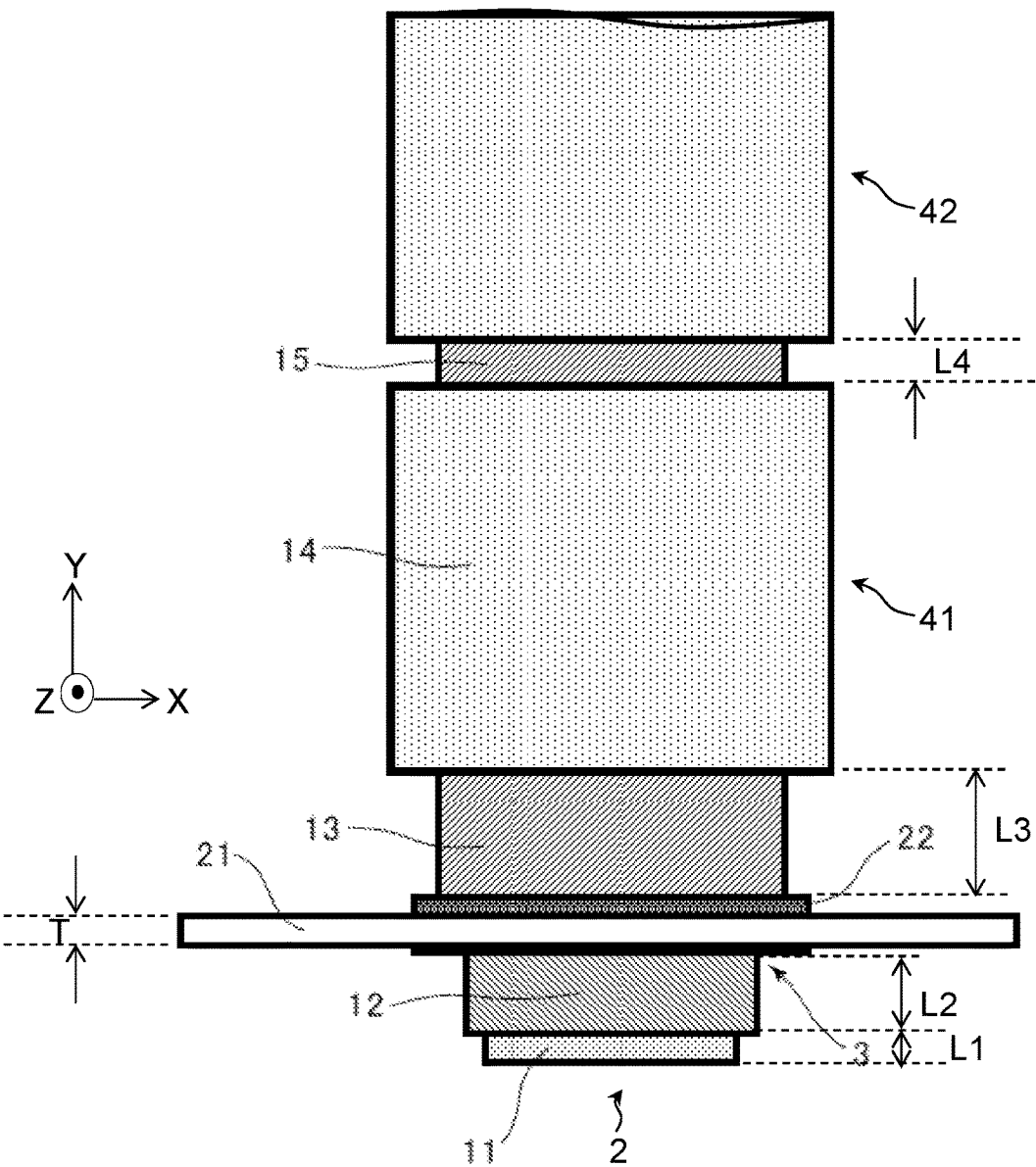
FIG. 3 is a schematic explanatory view of the vicinity of an end portion of a solid oxide fuel cell unit according to one embodiment of the present invention.

FIG. 3 shows the end portion 2 and the vicinity thereof in a state where the solid oxide fuel cell unit 1 is inserted into the fuel gas tank 20. In one embodiment of the present invention, the solid oxide fuel cell unit 1 is inserted into a hole 3 provided in a plate 21 formed in the fuel gas tank 20, and integrated together by a glass joint 22. A relationship of L3>L4 is satisfied, where L3 is the length of an exposed electrolyte portion 13 present between the exposed fuel electrode portion 12 and the air electrode 14, and L4 is the length of the exposed insulating electrolyte portion 15 present between the air electrodes 14 of the power generation element 41 and the power generation element 42. In addition, a relationship of L3>L2 is satisfied, where L2 is the length of the exposed fuel electrode portion 12. In addition, a relationship of T<(L1+L2)×2 is satisfied, where L1 is the length of an exposed insulating support portion 11, and T is the thickness of the plate 21 of the fuel gas tank 20.

Figure 4:
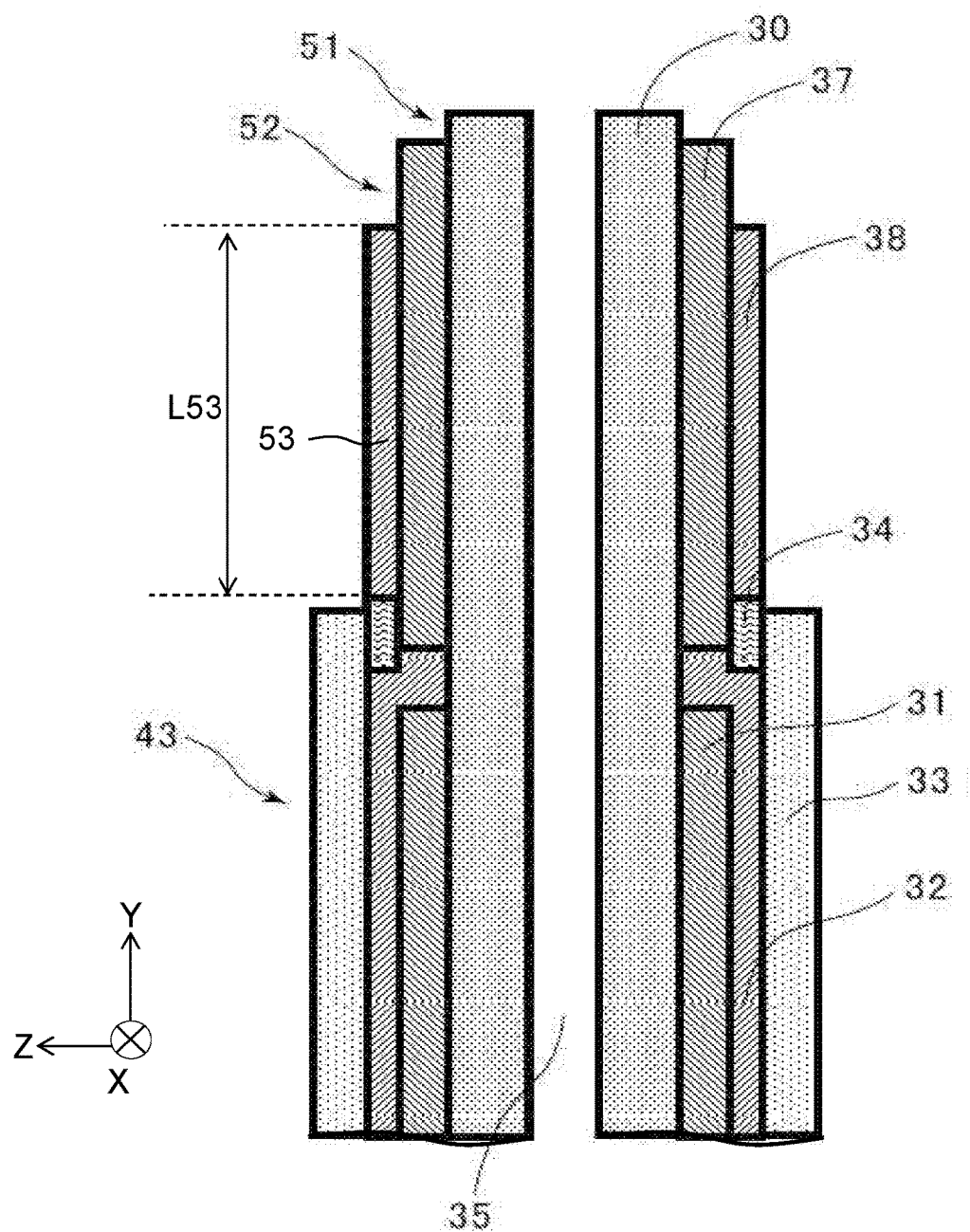
FIG. 4 is a cross-sectional view of another end portion of the solid oxide fuel cell unit according to the embodiment of the present invention.
Figure 5:
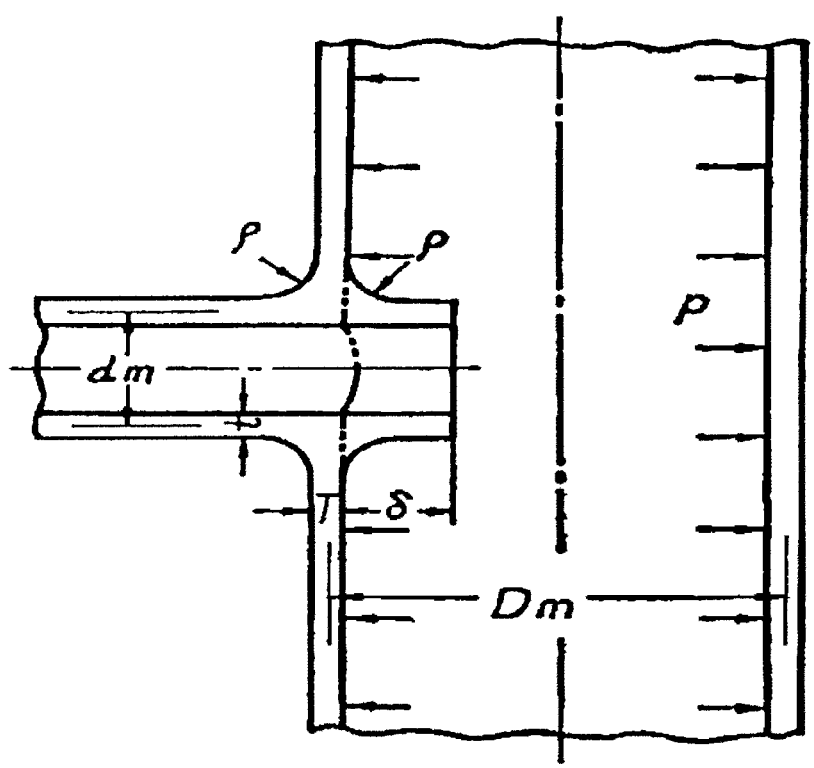
FIG. 5 is a material to which reference is made in the present invention, and shows a cross-sectional view in which a main tube and a branch tube are joined perpendicularly to each other in a through manner.
Figure 6:
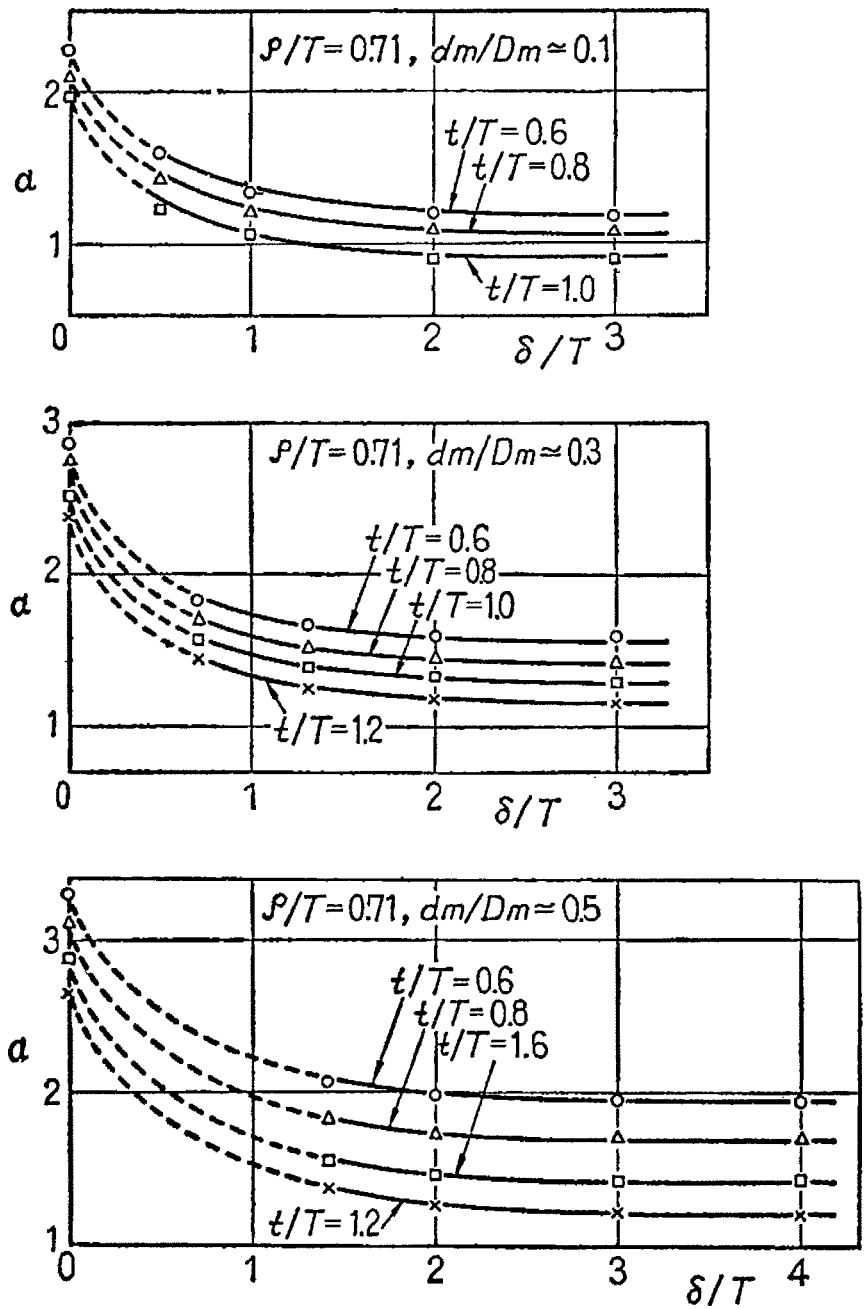
FIG. 6 is a material to which reference is made in the present invention, and shows graphs showing the relationship between δ/T and stress concentration factor α.

In FIG. 1, an end portion 4 of the solid oxide fuel cell units 1 is not joined, but can be joined to a tank or the like, as in the case of the end portion 2. FIG. 4 shows a cross-sectional view of the end portion 4 on the opposite side of the solid oxide fuel cell unit 1 from the end portion 2 shown in FIG. 2. In FIG. 4, one power generation element is exemplarily illustrated. In one embodiment of the present invention, the insulating support 30 having the gas flow path 35 therein is made of a porous oxide material mainly containing forsterite (Mg$_2$SiO$_4$). In one embodiment of the present invention, a power generation element 43 comprises, from the inside, a fuel electrode 31 made of YSZ with nickel or nickel oxide, an electrolyte 32 made of LSGM, and an air electrode 33 made of LSCF. In addition, although not illustrated, a fuel electrode catalyst layer made of GDC with nickel or nickel oxide and a reaction inhibition layer made of LDC may be formed between the fuel electrode 31 and the electrolyte 32. In addition, an unillustrated power generation element 44 is provided on the opposite side of the power generation element 43 from the cell end portion. The power generation element 43 and the power generation element 44 are electrically connected to each other by an interconnector 34 made of SLT. In addition, at the end portion of the power generation element 43, the air electrode 33 is connected to an electrically conductive layer 37 through another interconnector 34. The electrically conductive layer 37, except for end portions thereof, is covered with a gas-tight layer 38. The electrically conductive layer 37 is made of the same components as those of the fuel electrode 31. The gas-tight layer 38 is made of the same component as that of the electrolyte 32.

In one embodiment of the present invention, a relationship of L53>L54 is satisfied, where L53 is the length of the exposed gas-tight layer portion 53 present between the exposed portion of the electrically conductive layer 37 and the air electrode 33, and L54 is the length of an unillustrated exposed insulating electrolyte portion 54 present between the air electrodes of the power generation element 43 and the power generation element 44. In addition, a relationship of L53>L52 is satisfied, where L52 is the length of an exposed electrically conductive layer portion 52. In addition, when the end portion 4 is joined to the fuel gas tank 20, a relationship of T<(L51+L52)×2 is satisfied, where L51 is the length of the exposed insulating support portion 51, and T is the thickness of the wall 21 of the fuel gas tank 20.

The exposed insulating support portion 11 preferably has the same length as that of the exposed insulating support portion 51, the exposed fuel electrode portion 12 preferably has the same length as that of the exposed electrically conductive layer portion 52, and the exposed electrolyte portion 13 preferably has the same length as that of the exposed gas-tight layer portion 53. In other words, preferably the end portion 2 and the end portion 4 are symmetrically disposed in appearance.

It is only necessary that a portion where the solid oxide fuel cell unit 1 is connected to the fuel gas tank should have the structure of FIG. 2 or 4, and the end portion 2 and the end portion 4 may be exchanged with each other. Both ends of the solid oxide fuel cell unit 1 may have the structure of FIG. 2 or 4.

The insulating support 30 is not limited to that made of forsterite, and the electrolyte 32 is not limited to that of LSGM, neither. A material having a higher coefficient of thermal expansion than that of the electrolyte 32 can be selected for the insulating support 30. For example, YSZ stabilized with 10% by mole of Y$_2$O$_3$ may be selected for the electrolyte 32, and an oxide that contains MgO may be selected for the insulating support 30.

Moreover, the fuel electrode 31 is not limited to that made of YSZ. For example, the fuel electrode 31 may be made of a stabilized ZrO$_2$, which is ZrO$_2$ doped with a rare earth or an oxide thereof. In addition, the fuel electrode 31 may be made of CeO$_2$ doped with Ga, La, or the like, or may be made of Y$_2$O$_3$.

In addition, the glass joint 22 is not limited to glass. Crystallized glass, a ceramic adhesive agent, or the like may also be used.

What is claimed is:

1. A solid oxide fuel cell unit comprising:
an insulating support having a gas flow path running therein; and
a first power generation element provided on a surface of the insulating support in a first end of the insulating support,
wherein the first power generation element comprises a fuel electrode, an electrolyte and an air electrode, the fuel electrode, the electrolyte and the air electrode being sequentially laminated one over another in this order from inner most to outer most, the fuel electrode including a first surface and a second surface, the first surface being located between the fuel electrode and the electrolyte, the second surface being located between the fuel electrode and the insulating support, the insulating support being made of a porous material comprising an oxide, and the electrolyte being made of an oxide having a smaller coefficient of thermal expansion than a coefficient of thermal expansion of the insulating support,
the solid oxide fuel cell unit further comprises an exposed electrolyte portion, which is a portion of the electrolyte exposed, uncovered by the air electrode, an exposed fuel electrode portion, which is a portion of the fuel electrode exposed on the first surface, uncovered by either the electrolyte or the air electrode, and an exposed insulating support portion, which is a portion of the insulating support located in the first end thereof that is exposed, uncovered by any of the fuel electrode, the electrolyte and the air electrode, and
the exposed insulating support portion, the exposed fuel electrode portion, and the exposed electrolyte portion are arranged one next to another in this order along the gas flow path from the first end of the insulating support.

2. The solid oxide fuel cell unit according to claim 1, wherein
the gas flow path runs in a direction perpendicular to a lamination direction of the fuel electrode, the electrolyte and the air electrode,
the solid oxide fuel cell comprises a second power generation element comprising a fuel electrode, an electrolyte and an air electrode, the fuel electrode, the electrolyte and the air electrode being sequentially laminated one over another in this order from inner most to outer most, the insulating support being made of a porous material comprising an oxide, and the electrolyte being made of an oxide having a smaller coefficient of thermal expansion than a coefficient of thermal expansion of the insulating support, and
the solid oxide fuel cell unit further comprises:
an interconnector electrically connecting the fuel electrode of the second power generation element to the air electrode of the first power generation element; and
an exposed insulating electrolyte portion, which is a portion of the electrolyte of the second power generation element exposed, uncovered by the air electrode of the second power generation element, provided to separate the interconnector and the air electrode of the second power generation element for electrical insulation therebetween and separate the air electrodes of the first and second power generation elements for electrical insulation therebetween, wherein a relationship of L3>L4 is satisfied, where L4 represents a length of the exposed insulating electrolyte portion along the gas flow path, and L3 represents a length of the exposed electrolyte portion along the gas flow path.

3. The solid oxide fuel cell unit according to claim 1, wherein a relationship of L3>L2 is satisfied, where L2 represents a length of the exposed fuel electrode portion along the gas flow path, and L3 represents a length of the exposed electrolyte portion along the gas flow path.

4. A solid oxide fuel cell stack comprising:
the solid oxide fuel cell unit according to claim 1; and
a fuel gas tank, wherein the fuel gas tank is gas-tightly joined around the exposed electrolyte portion.

5. The solid oxide fuel cell stack according to claim 4, wherein a relationship of T<(L1+L2)×2 is satisfied, where L1 represents a length of the exposed insulating support portion along the gas flow path, L2 represents a length of the exposed fuel electrode portion along the gas flow path, and T is a thickness of the fuel gas tank along the gas flow path measured at a location where the fuel gas tank and the solid oxide fuel cell unit are gas-tightly joined to each other.

6. The solid oxide fuel cell stack according to claim 1, further comprising a third power generation element provided in a second end of the insulating support, wherein the third power generation element comprises a fuel electrode, an electrolyte and an air electrode all of which are configured similarly in a mirror image with the fuel electrode, the electrolyte and the air electrode of the first power generation element.

* * * * *